US006545613B1

United States Patent
Hornback

(10) Patent No.: US 6,545,613 B1
(45) Date of Patent: *Apr. 8, 2003

(54) CIRCUIT FOR COMPENSATION OF A TRANSDUCER OUTPUT SIGNAL

(75) Inventor: Edward R. Hornback, Dexter, MI (US)

(73) Assignee: Kelsey-Hayes Company, Livonia, MI (US)

( * ) Notice: Subject to any disclaimer, the term of this patent is extended or adjusted under 35 U.S.C. 154(b) by 79 days.

This patent is subject to a terminal disclaimer.

(21) Appl. No.: 09/721,323

(22) Filed: Nov. 22, 2000

Related U.S. Application Data

(63) Continuation-in-part of application No. 09/448,116, filed on Nov. 24, 1999, now Pat. No. 6,312,061.
(60) Provisional application No. 60/109,913, filed on Nov. 25, 1998.

(51) Int. Cl.[7] ............................................... G08C 19/00
(52) U.S. Cl. ................................................. 340/870.14
(58) Field of Search ........................ 340/870.11, 870.13, 340/870.14, 870.04, 2.4; 338/4; 303/20; 370/299

(56) References Cited

U.S. PATENT DOCUMENTS

| 3,943,488 A | * | 3/1976 | Kazahaya | 340/2.4 |
| 4,442,716 A | | 4/1984 | Coe et al. | |
| RE31,906 E | * | 6/1985 | Oyoma | 364/431.06 |
| 4,680,585 A | * | 7/1987 | Fasching | 340/870.13 |
| 4,753,105 A | | 6/1988 | Juanarena et al. | |
| 5,866,822 A | | 2/1999 | Willig | |

FOREIGN PATENT DOCUMENTS

| WO | WO 99/50115 | 10/1999 |

* cited by examiner

Primary Examiner—Jack Lavinder
Assistant Examiner—C. T. Bartz
(74) Attorney, Agent, or Firm—MacMillan, Sobanski & Todd, LLC

(57) ABSTRACT

A signal conditioning circuit is provided for a plurality of pressure signals generated by individual pressure sensors mounted upon a hydraulic control valve. The signal conditioning circuit sequentially samples each of the pressure sensors and multiplexes the individual pressure signals into a single analog pressure signal. The signal conditioning circuit includes a differential amplifier that is compensated for offset and linearity as a function of which particular pressure sensor is being sensed.

25 Claims, 13 Drawing Sheets

CIRCUIT FOR COMPENSATION OF A TRANSDUCER OUTPUT SIGNAL

CROSS REFERENCE TO RELATED APPLICATIONS

This application is a continuation-in-part of U.S. patent application Ser. No. 09/448,116 filed on Nov. 24, 1999 and also claims the benefit of U.S. Provisional Application No. 60/109,913, filed Nov. 25, 1998, now U.S. Pat. No. 6,312,061.

BACKGROUND OF THE INVENTION

This invention relates in general to electro-hydraulic brake systems and in particular to compensation of pressure signals generated by a cluster of pressure sensors upon an electro-hydraulic brake system control unit.

An electro-hydraulic brake system (EHB) combines the advantages of an electric braking system with components of a conventional hydraulic brake system. Thus, an EHB can be considered as an intermediate hybrid system which includes features of both a conventional hydraulic brake system and a brake by wire system (BBW). By utilizing conventional hydraulic brake components, development and conformance costs and times are reduced.

Referring now to FIG. 1, there is shown, generally at 10, a typical EHB. The EHB 10 includes a pedal unit 11 which is hydraulically connected to a hydraulic control unit (HCU) 12. The hydraulic control unit 12 forms an interface between the pedal unit 11 and a pair of conventional hydraulically actuated vehicle front wheel brakes 13 and a pair of conventional hydraulically actuated vehicle rear wheel brakes 14.

The pedal unit 11 includes a tandem master cylinder 15 which is supplied with brake fluid from a master cylinder reservoir 16. The master cylinder 15 is connected by a conventional mechanical linkage to a vehicle brake pedal 17. The brake pedal 17 also is coupled to a displacement transducer 18 which generates an electrical signal having an amplitude which is proportional to brake pedal travel. One chamber of the master cylinder 15 is connected by a first hydraulic brake line 19 while the other chamber of the master cylinder 15 is connected to a second hydraulic brake line 20. The pedal unit 11 also includes a normally closed valve 21 which connects the first brake hydraulic brake line 20 circuit to a pedal travel simulator 22. The pedal travel simulator 22 is an electro-hydraulic device which is operative during operation of the EHB 10 to provide brake pedal resistance and force as feedback to the vehicle operator.

The HCU 12 includes a first normally open isolation valve 23 which is connected between the first hydraulic brake line 19 and one of the front wheel brakes 13 and a second normally open isolation valve 24 which is connected between the second hydraulic brake line 20 and the other of the front wheel brakes 13. Each of the front wheel brakes 13 is connected through an isolator piston 25 to a pair of proportional control valves 26 whose purpose will be explained below. The second valve of each pair of proportional control valves 26 is connected to a corresponding rear wheel brake 14. The isolator pistons 25 hydraulically isolate the front wheel brakes 13 from the rear wheel brakes 14. As shown in FIG. 1, the front wheel brakes 13 are hydraulically connected through a first balance valve 27. Similarly, the rear wheel brakes 14 are hydraulically connected through a second balance valve 28.

The HCU 12 further includes a motor driven pump 35 as a source of pressurized brake fluid for actuation of the wheel brakes 13 and 14. The pump 35 has an intake port which draws brake fluid through a hydraulic line 36 from the master cylinder reservoir 16. The pump 35 also has a discharge port which is connected through each of the proportional control valves 26 to a corresponding front or rear wheel brake 13 or 14. Each of the proportional control valves 26 includes a discharge port which is connected though a hydraulic discharge line 38 to the master cylinder reservoir 16. The discharge port of the pump 35 also is connected through a relief valve 39 to a high pressure accumulator 40.

A plurality of pressure sensors are included in the EHB 10. The pressure applied to the HCU 12 by the master cylinder 15 is monitored by a brake actuation pressure sensor 45 which is illustrated in FIG. 1 as being mounted in the first hydraulic brake line 19 between the master cylinder 15 and the first isolation valve 23. Alternately, the brake actuation pressure sensor 45 can be mounted in the second hydraulic brake line 20 between the master cylinder 15 and the second isolation valve 24 (not shown). The brake actuation pressure sensor 45 is rated to measure relatively low pressures which are on an order of magnitude of 60 bar (900 psi). A wheel brake pressure sensor 47 is included in each hydraulic line connecting each proportional control valve 26 to the associated wheel brake. The wheel brake pressure sensors 47 monitor the pressure being applied to the associated wheel brake and are rated to measure relatively high brake actuation pressures which are on an order of magnitude of 200 bar (3,000 psi). An accumulator pressure sensor 48 is connected to the high pressure accumulator 40 and monitors the output pressure of the accumulator 40. When the pump pressure exceeds the accumulator pressure or when the relief valve 39 is open, the accumulator pressure sensor 48 measures the pump output pressure. The accumulator pressure sensor 48 is also rated to measure relatively high pressures which are on an order of magnitude of 200 bar (3,000 psi).

The solenoid valves and pressure sensors are electrically connected to a microprocessor (not shown) which is included in an Electronic Control Module (ECU) (not shown). The ECU can either be mounted upon the HCU 12 or located remotely from the HCU 12. The ECU microprocessor is programmed with appropriate software to monitor the output signals from the pressure sensors 45, 47 and 48 and the brake pedal transducer 18. The microprocessor is responsive to the sensed pressures and displacement of the brake pedal transducer 18 to energize the pump 35 and to selectively actuate the proportional control valves 26 to supply pressurized hydraulic fluid for actuation of the wheel brakes 13 and 14.

The operation to the EHB 10 will now be described. During vehicle operation, the microprocessor associated with the HCU 12 continuously receives electrical signals from the brake pedal transducer 18 and the pressure sensors 45, 47 and 48. The microprocessor monitors the condition of the brake pedal transducer 18 and the pressure signals from the brake actuation pressure sensors 45 for potential brake applications. When the vehicle brake pedal 17 is depressed, the brake pedal displacement transducer 18 generates a displacement signal. Simultaneously, the brake actuation pressure sensor 45 generates a signal which is proportional to the force applied to the brake pedal 17. The microprocessor is operative to combine the displacement and force signals into a brake command signal. The microprocessor software is responsive to the brake command signal to actuate the pump motor and close the isolation valves 23 and 24 to separate the master cylinder 15 from the wheel brakes 13 and 14. The microprocessor then selectively operates the proportional control valves 26 in the HCU 12 unit to cyclically relieve and reapply hydraulic pressure to the wheel brakes 13 and 14. The hydraulic pressure applied to the wheel brakes is adjusted by the operation of the proportional control valves 26 to produce adequate brake torque to decelerate the vehicle in accordance with the brake command signal generated by the vehicle operator.

If the EHB 10 should fail, the isolation valves 23 and 24 return to their normally open positions to provide unassisted push though braking by allowing direct hydraulic communication between the master cylinder 15 and the front wheel brakes 13.

SUMMARY OF THE INVENTION

This invention relates to a method and apparatus for compensation of pressure signals generated by a cluster of pressure sensors upon an electro-hydraulic brake system control unit.

It is known to include multiple pressure sensors in an electro-hydraulic brake unit. However, each sensor and associated bridge circuitry requires a compensation circuit to correct for offset voltages. Accordingly, it is known to provide a compensation circuit for each sensor. Additionally, associated signal conditioning circuitry may include a differential amplifier which requires compensation for offset voltage and/or linearity. However, the number of compensation circuits increases the complexity of the circuitry and requires a significant number of electrical connectors between the sensors and the electro-hydraulic brake unit microprocessor. Accordingly, it would be desirable to provide a simpler method for compensation of the pressure sensors.

The present invention contemplates a hydraulic control valve that includes a control valve body having a plurality of passageways formed therein. The passageways are adapted to be connected to a hydraulic control system. A plurality of pressure sensors are carried by the control valve body with each of the pressure sensors communicating with a selected one of the passageways. The sensors are operative to generate a pressure signal voltage that is a function of a fluid pressure in the selected passageway. The control valve also has a signal conditioning circuit carried by the control valve body. The signal conditioning circuit is operative to sequentially sample the pressure signal voltages and to generate an analog multiplexed signal that includes the pressure signal voltage samples.

It is further contemplated that the pressure sensors include a bridge circuit. Each of the bridge circuits generates a first output voltage and a second output voltage with the difference between the first and second output voltages being proportional to the fluid pressure. The signal conditioning circuit also includes a first multiplexer having a plurality of input terminals with a selected input terminal connected to the first bridge output voltage of each sensor bridge circuit. Similarly, a second multiplexier having a pluraltiy of input terminals has a selected input terminal connected to the second output voltage of each bridge circuit. The first multiplexer is operative to generate a first multiplexed output voltage at a first output terminal while the second multiplexer is operative to generate a second multiplexed output voltage at a second output terminal. The first multiplexer output terminal is connected to a first input terminal of a differential amplifier and the second multiplexer output terminal is connected to a second input terminal of the differential amplifier. The differential amplifier has an output terminal connected to an input port of a microprocessor. The differential amplifier is operational to generate a multiplexed pressure voltage signal that includes the difference of each of the bridge first and second voltage signals and to apply the multiplexed pressure voltage signal to the microprocessor input port.

The signal conditioning circuit also includes a first digital resistor connected across a voltage supply. The first digital resistor has an output tap terminal connected to an input terminal of the differential amplifier and a control terminal connected to the microprocessor. The microprocessor is operative to select a value for the first digital resistor that corresponds to a particular sensor bridge circuit. The first digital resistor causes a voltage to be applied to said differential amplifier input port to compensate for an offset voltage generated by the sensor bridge circuit and/or the differential amplifier.

The hydraulic control valve also can include a temperature sensor mounted upon the valve body and connected to the microprocessor. The temperature sensor is operative to generate a temperature signal that is proportional to the temperature of the hydraulic fluid. The microprocessor is operative to select a compensating digital resistor value that is a function of both the bridge circuit being sensed and the fluid temperature.

The signal conditioning circuit also can include a second digital resistor connected between the output terminal of the differential amplifier and an input terminal thereof. The second digital resistor has an output tap terminal connected to the same differential amplifier input terminal and a control terminal connected to the microprocessor. The microprocessor is operative to select a value for the second digital resistor that corresponds to a particular sensor bridge circuit to provide gain compensation for the differential amplifier.

Alternately, the signal conditioning circuit can include a digital to analog converter having an output terminal connected to an input terminal of the differential amplifier and an input terminal connected to the microprocessor. The microprocessor is operative to select an input value for the digital to analog converter that corresponds to a particular sensor bridge circuit. As a result, the digital to analog converter will cause a voltage to be applied to the differential amplifier input port to compensate for an offset voltage generated by the sensor bridge circuit and/or the differential amplifier.

As another alternate, the signal conditioning circuit can include a third multiplexer having a plurality of input terminals. Each of the multiplexer input terminals is connected to a charged capacitor. The third multiplexer also has an output terminal connected to an input terminal of the differential amplifier and a control terminal connected to the microprocessor. The microprocessor is operative to cause the third microprocessor to selectively connect one of the charged capacitors that corresponds to a particular sensor bridge circuit to the differential amplifier input terminal. As a result, the charged capacitor will apply a voltage to the differential amplifier input port to compensate for an offset voltage. It is contemplated that the microprocessor sequentially connects the capacitors to the differential amplifier input terminal to provide compensation for each of the sensor bridge circuits and/or the differential amplifier. While one of the capacitors is connected to the differential amplifier, the other capacitors are recharged. The capacitors are recharged with a Pulse Width Modulated signal having a variable duty cycle. The duty cycle is selected to charge the corresponding capacitor to a desired voltage level.

The invention also contemplates a method for compensating a signal conditioning circuit including providing a signal conditioning circuit connected to a plurality of bridge circuits. The signal conditioning circuit includes a differential amplifier having a compensating component connected to an input terminal thereof. The signal conditioning circuit is operative to sequentially sample the output voltages of the individual bridge circuits. A value for the compensating component is selected that corresponds to the individual bridge circuit being sampled. Then the compensating component is caused to apply a compensating voltage to the differential amplifier input terminal that is a function of the selected value whereby the differential amplifier offset is compensated.

Additionally, the signal conditioning circuit also can include a temperature sensor with the method including sensing the temperature and selecting a value for the compensating component that is a function of both the individual bridge circuit being sampled and the temperature.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
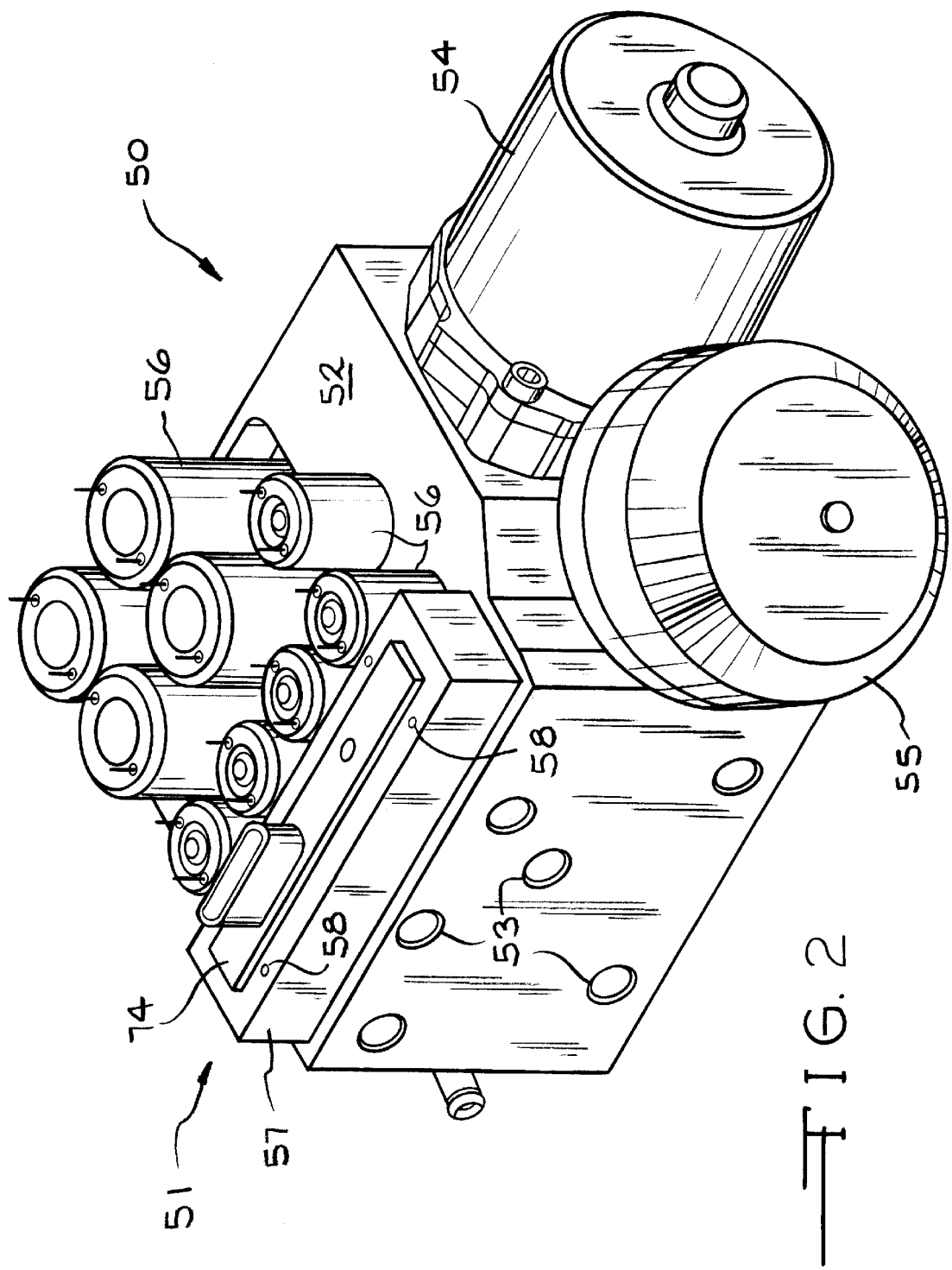
FIG. 2 is a perspective view of an EHB HCU which includes a pressure sensor cluster.

Referring again to the drawings, there is illustrated in FIG. 2, a HCU 50 which includes a pressure sensor cluster 51 which is in accordance with the present invention. As will be described below, the pressure sensor cluster 51 includes a plurality of pressure sensors and associated pressure signal conditioning circuitry. The pressure sensor cluster 51 is attached to the top surface of a HCU valve body 52. A plurality of ports 53 formed in the front of the HCU valve body 52 receive hydraulic lines (not shown) which communicate with the wheel brakes (not shown) and the master cylinder (not shown). A pump motor 54 and fluid accumulator 55 extend from the side of the HCU valve body 52. A plurality of solenoid coils 56 extend from the top of the of the HCU valve body 52.

The pressure sensor cluster 51 includes a pressure sensor cluster housing 57 which is secured to the HCU valve body 52 by a plurality of threaded fasteners 58. In the preferred embodiment, the housing 57 is cast from metal or machined from metal bar stock; however, the housing also can be formed from other materials, such as, for example, a ceramic or a plastic. As best seen in the sectional view shown in FIG. 3, the housing 57 has a plurality of bores 58 formed therethrough. In the preferred embodiment, six bores 58 are formed in the housing to correspond to the EHB 10 described above; however, the invention also may be practiced with more or less bores 58 formed in the housing 57. Each of the housing bores 58 receives a pressure sensor 59, which, in the preferred embodiment are formed from stainless steel. Each pressure sensor 59 includes a generally cylindrical housing 60 having a stepped axial bore 62 formed therein which extends axially from the bottom surface of the housing 60. As will be described in more detail below, the upper end of each bore 62 terminates in a thin diaphragm 64, upon which a pressure sensor array (not shown) is mounted. The lower end of the sensor housings are flared to form a flange 66 which extends in an outward radial direction from the housing 60. The flanges 66 cooperate with the pressure sensor cluster housing 57 to limit the distance the sensors 59 extend into the bores 58. In the preferred embodiment, the housing 57 is staked against the flanges 66 to secure the sensors 59 in the bores 58. However, other conventional methods also can be sued to secure the sensors 59 in the housing bores 58, such as, for example welding the flanges 66 to the housing 57.

A plurality of electrical conductors 68 extend from each sensor array and are connected to a Printed Circuit Board 70 (PCB) for the pressure sensor cluster. A signal conditioning circuit, which will be described below, is mounted upon the upper surface of the PCB 70. Electrical traces (not shown) deposited upon the upper surface of the PCB 70 connect the conductors 68 through the signal conditioning circuit and to a single electrical connector 72. Alternately, the electrical traces also can be deposited upon the lower surface of the PCB 70 (not shown) and covered with a layer of electrically insulative material. The connector 72 and PCB 70 are enclosed by a cover 74, as shown in FIG. 2. In the preferred embodiment, a gortex vent 74A is mounted in an aperture formed through the cover 74 to provide for atmospheric pressure balancing. The connector 72 is electrically connected to the EHB microprocessor and transmits the pressure signals generated by the pressure sensing arrays thereto. Alternately, if the EHB electronics are mounted upon the HCU valve body 52, the cover 74 can be omitted and the terminals 75 extending from the connector 72 electrically connected directly to the EHB circuit board.

Figure 3:
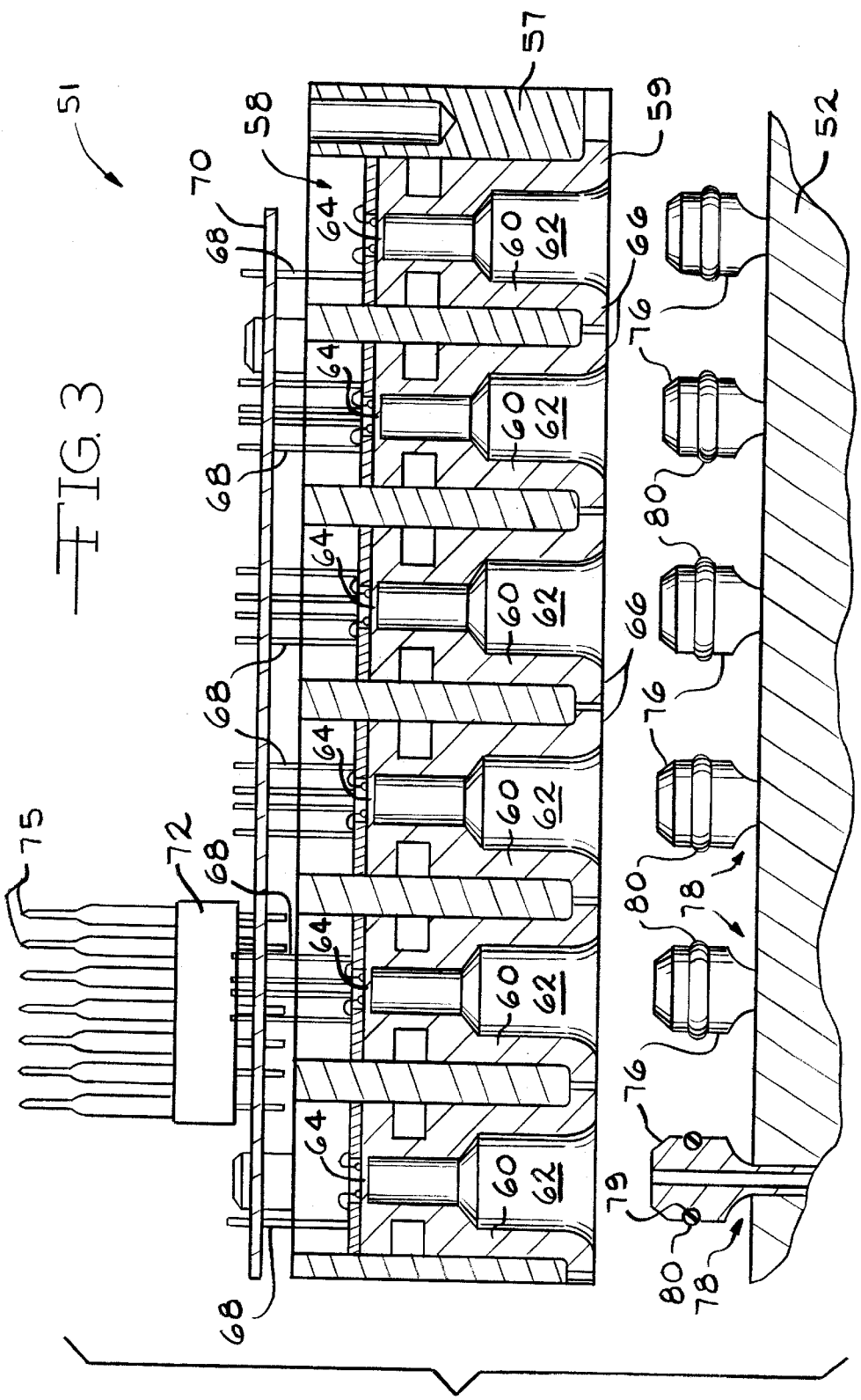
FIG. 3 is a sectional view of the pressure sensor cluster shown in FIG. 2.

As shown in FIG. 3, each of the bores 62 formed in the pressure sensors 59 receives a corresponding transfer tube 76 which extends upwardly from the top surface of the HCU valve body 52. The transfer tubes 76 are hollow cylinders, as shown in the sectional view of the left tube 76 in FIG. 3, which communicate with corresponding pressure sensing ports 78 formed in the HCU valve body 52. The transfer tubes 76 serve to minimize the volume of air that could be trapped when bleeding the EHB system. The upper section of the bore can be shortened to further reduce the possibility of air entrapment. The transfer tubes 76 also provide a degree of compliance to compensate for variations in the sensor bore locations. The pressure sensing ports 78 communicate through valve body internal passageways with components of the EHB system. A circumferential groove 79 formed in the upper end of each of the transfer tubes 76 carries a resilient O-ring 80. The O-ring 80 co-operates with the surface of the corresponding pressure sensor bore 62 to form a seal therebetween to prevent the escape of hydraulic brake fluid.

Figure 1:
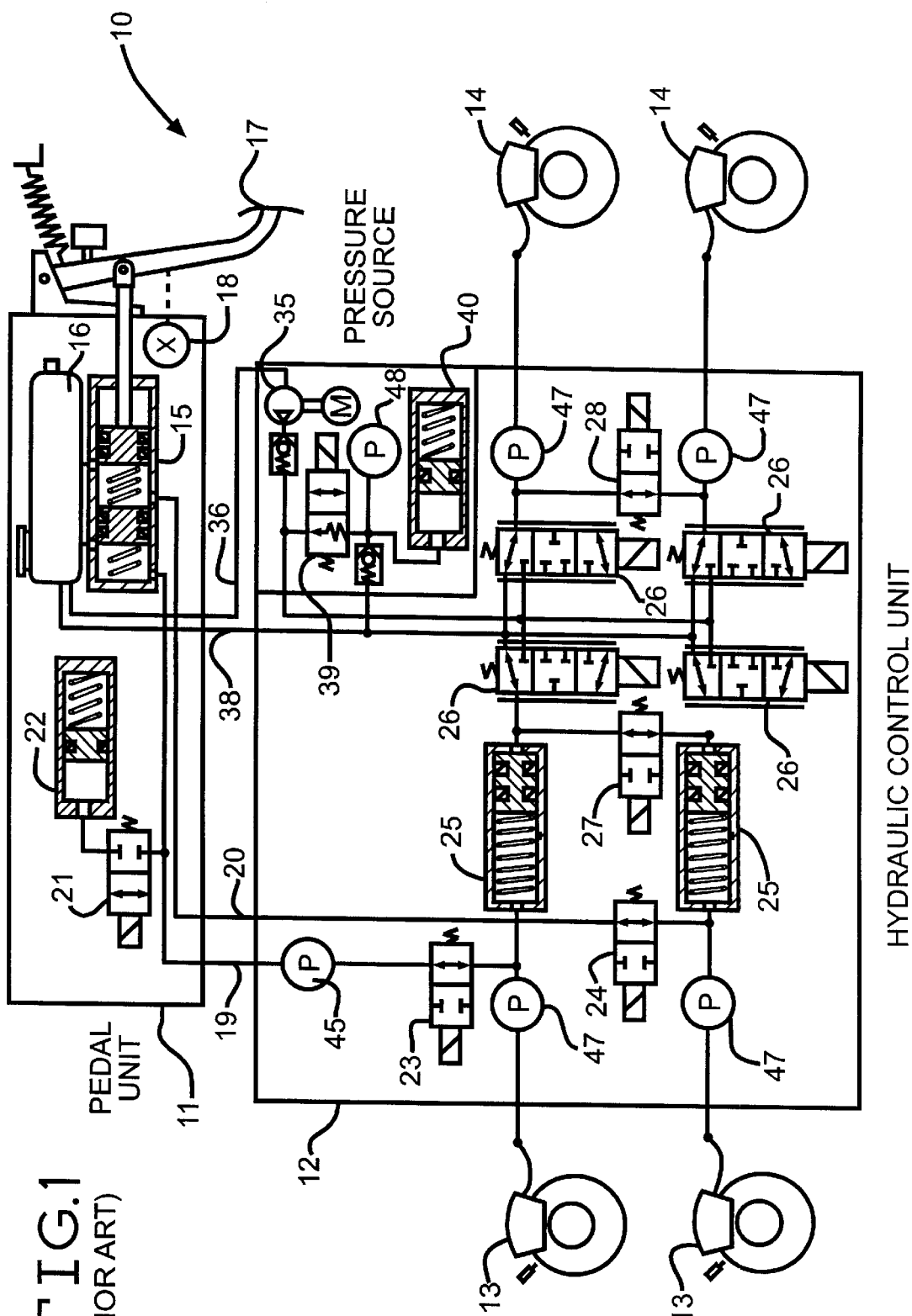
FIG. 1 is a schematic diagram of a typical electro-hydraulic brake system.

As indicated above, there are six pressure sensors 59 and transfer tubes 76, which correspond to the EHB 10 illustrated in FIG. 1. Accordingly, four pressure sensors monitor the pressure at each of the vehicle wheel brakes, one pressure sensor monitors the brake circuit actuation pressure and one pressure sensor monitors the accumulator pressure.

Further details of the pressure sensor cluster structure are included in U.S. patent application Ser. No. 09/448,116, which was filed on Nov. 24, 1999, and which is incorporated herein by reference.

The operation of the pressure sensor 51 cluster will now be described. Hydraulic brake fluid flows through the pressure passageways formed in the HCU and into the associated pressure sensors 59. The brake fluid fills the bore 62 of the pressure sensor 59. As pressure of the brake fluid changes, the pressure change is applied uniformly to the interior surface of the pressure sensor bore 62, causing the thin diaphragm 64 formed across the upper end of the bore 62 to deflect. The deflection causes a change in the electrical characteristics of the bridge transducers 90 which are mounted upon the upper surface of the diaphragm 64. The changes in the transducer electrical characteristics are detected by a signal conditioning circuit 100 and transmitted through the connector 72 to the EHB microprocessor where an algorithm controls the operation of the EHB.

The pressure signals are time sampled and multiplexed into a single signal to allow the pressure data from all of the sensors 59 to be transmitted to the EHB microprocessor. It is contemplated that the invention utilizes five electrical interconnections, which is a significant reduction from the 18 electrical interconnection utilized in the prior art EHB system described above. Accordingly, the complexity of the wiring is greatly reduced with the structure of the invention.

Figure 4:
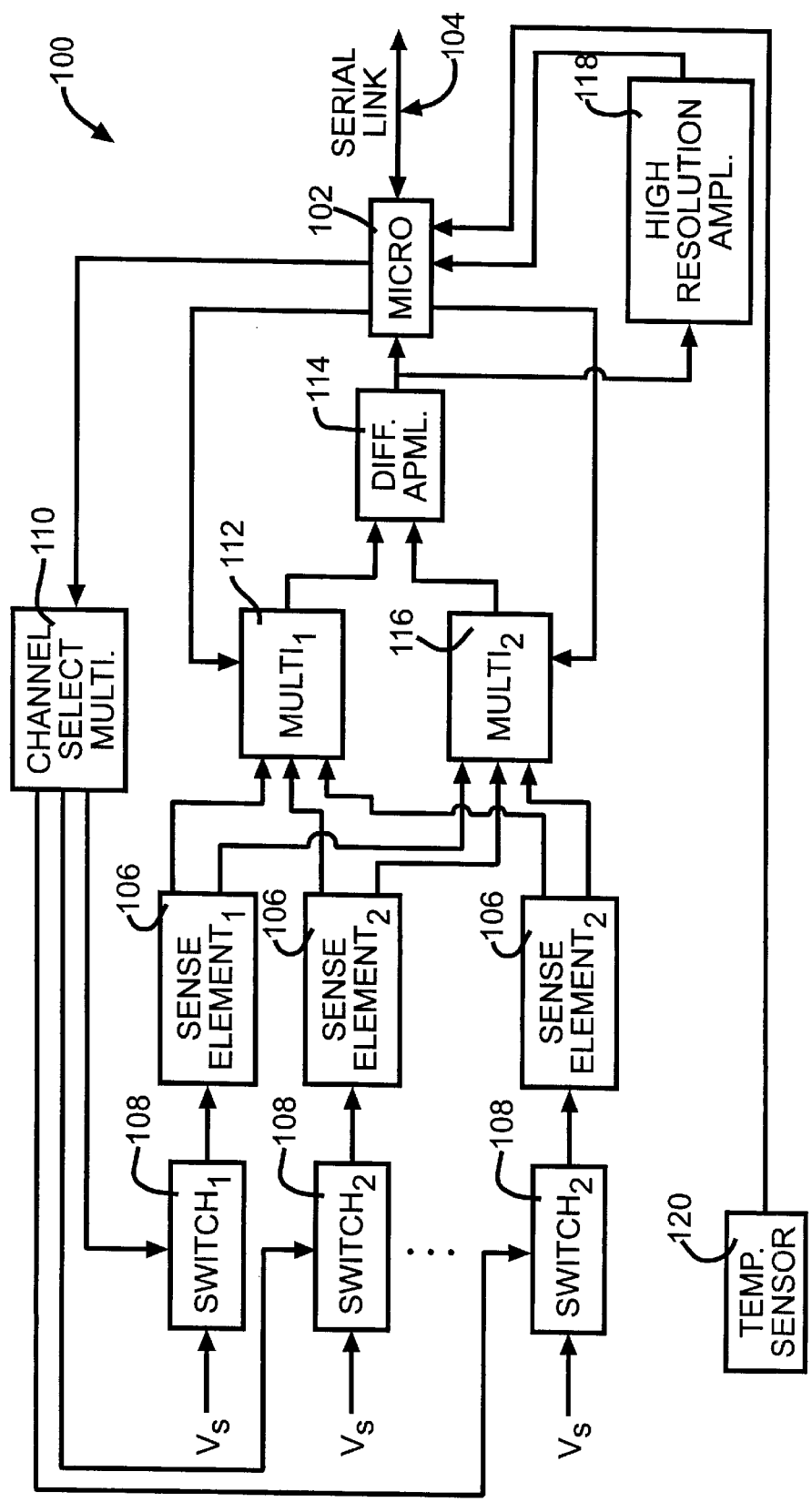
FIG. 4 is a block diagram for a signal conditioning circuit which is mounted upon the pressure sensor mounting structure shown in FIG. 4.

As described above, a signal conditioning circuit 100 is carried upon the PCB 70 mounted upon the pressure sensor cluster housing 57. A block diagram for the signal conditioning circuit 100 is shown in FIG. 4. The circuit 100 includes a Pressure Sensor Cluster (PSC) microprocessor 102 which is electrically connected through a bi-directional serial link 104 to the main control microprocessor in the EHB Electronic Control Unit (ECU) (not shown). Alternately, a parallel link (not shown) can connect the PSC microprocessor 102 to the EHB ECU. While the preferred embodiment is illustrated and described as utilizing a PSC microprocessor 102, it will be appreciated that the invention also may be practiced utilizing a microcontroller, a digital ASIC or a state machine in place of a microprocessor 102.

The PSC microprocessor 102 controls the application of power to the pressure sensor elements 106, which in the preferred embodiment are bridge circuits, by causing electronic switches 108 to change to their conducting states. In the preferred embodiment, the electronic switches 108 include a main power FET and channel FET's, as described below. For the EHB system 10 illustrated in FIG. 1, there are six pressure sensing elements 106; however, the signal conditioning circuit 100 may include more or less pressure sensing elements 106. In FIG. 4, the total number of pressure sensing elements is shown as "N". In the preferred embodiment, each pressure sensing element 106 includes a bridge circuit (not shown) which is mounted upon the upper surface of a corresponding pressure sensor diaphragm 64. Also in the preferred embodiment, each bridge circuit is connected to a power supply by an associated electronic switch 108 which is selectively closed by a channel selection multiplexer 110, The channel selection multiplexer 110 switches the electronic switches 108 between their non-conducting and conducting states to energize the individual pressure sensing elements 106. The channel selection multiplexer 110 is connected to and controlled by the PSC microprocessor 102.

The output signal on one side of each of the sense element bridge circuits is supplied through a first multiplexer 112 to a first input port of a differential low gain instrumentation amplifier 114. Similarly, the output signal on the other side of each of the sense element bridge circuits is supplied through a second multiplexer 116 to a second input port of the intrumention amplifier 114. The operation of the electronic switches 108 cooperates with the multiplexers 112 and 116 to cause the instrumentation amplifier 114 to generate a single multiplexed analog pressure signal which includes information generated by each of the pressure sensing elements 106.

The output of the instrumentation amplifier 114 is connected to a first input pin of the PSC microprocessor 102. The output of the instrumentation amplifier 114 also is connected to an input of a high resolution operation amplifier 118. In the preferred embodiment, the high resolution amplifier 118 has a gain of four. The output of the high resolution operational amplifier 118 is connected to a second input pin of the PSC microprocessor 102. The purpose for the high resolution operational amplifier 118 will be explained below. The PSC microprocessor 102 converts the multiplexed analog pressure signal into a digital pressure signal. The digital pressure signal is transmitted over the bi-directional serial link 104 to the main control microprocessor in the EHB and, optionally, to other vehicle systems, such as the engine controller microprocessor.

The signal conditioning circuit 100 can also includes a pair of temperature sensors 120 (one shown) which are connected to the PSC microprocessor 102. The temperature sensors 120 provide temperature data to the PSC microprocessor 102. The PSC microprocessor transmits the temperature data over the bi-directional serial link 104 to the main control microprocessor in the EHB. The main control microprocessor uses the temperature data to compensate the pressure readings. Alternately, the pressure signal can be conditioned by the PSC microprocessor 102 before being transmitted to the main EHB microprocessor.

Figure 5A:
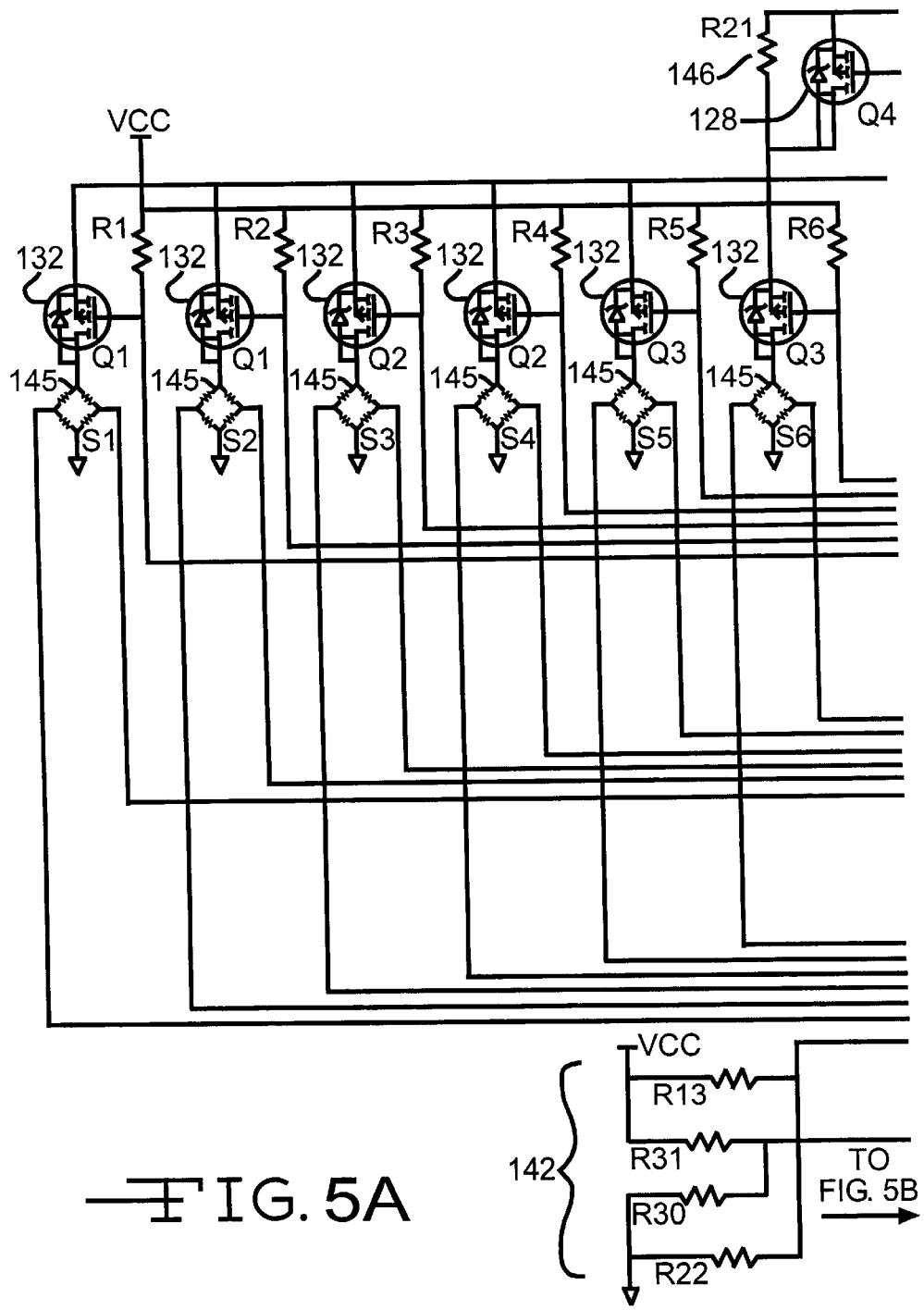
FIG. 5 is a schematic circuit diagram for the signal conditioning circuit shown in FIG. 4.
Figure 5B:
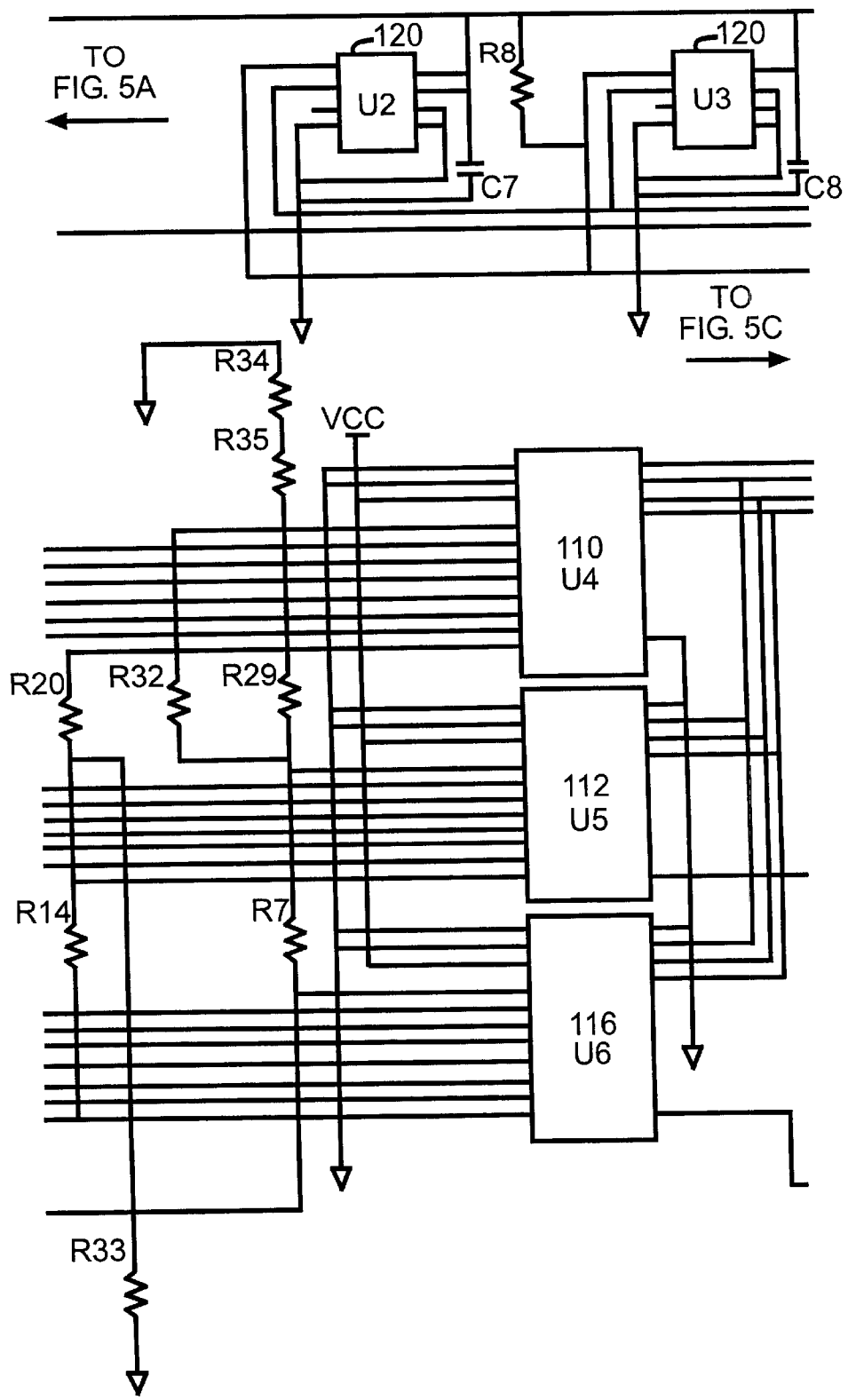
Figure 5C:
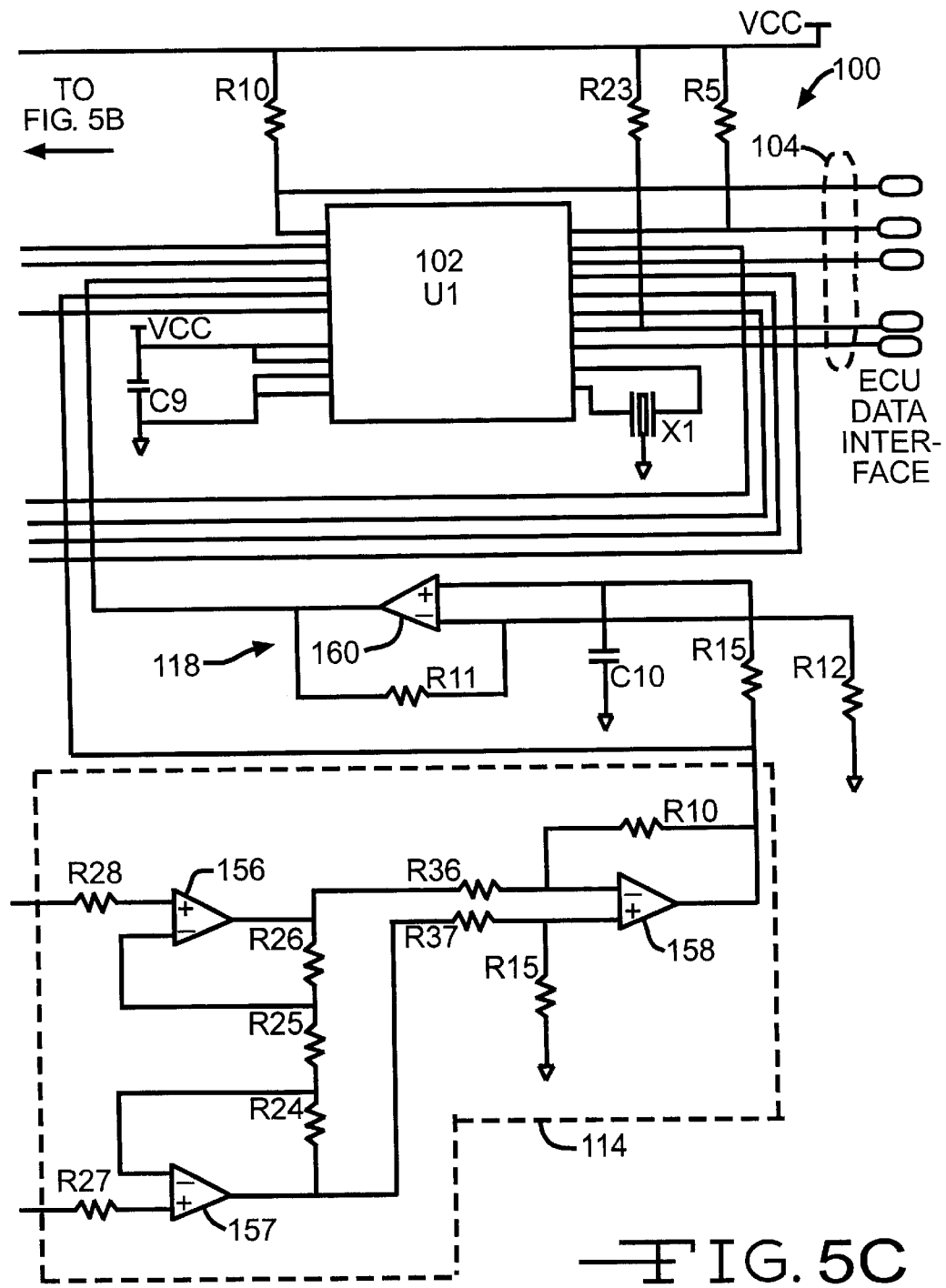

A schematic circuit diagram for the signal conditioning circuit 100 is shown in FIG. 5. The components shown in FIG. 5 which are similar to components shown in FIG. 4 have the same numerical designators. For clarity, FIG. 5 is shown on three sheets labeled 5A through 5C, with portions of the circuit 100 appearing on all sheets. As described above, the signal conditioning circuit 100 includes a microprocessor 102 which is electrically coupled by the bi-directional serial link 104 to the EHB microprocessor (not shown). The PSC microprocessor 102 receives pressure data signals from a plurality of bridge circuits 145, which are shown in the left portion of FIG. 5A. For the circuit shown, there are six transducer bridge circuits 145. Full bridge circuits are illustrated in FIG. 5A; however, the invention also can be practiced with half bridge circuits.

The transducer bridge circuits 145 are connected by a bridge FET 132 to a power supply VCC. The gates of the bridge FET's 132 are electrically connected to the channel selection multiplexer 110 which, in turn, is electrically connected to the PSC microprocessor 102. The channel selection multiplexer 110 switches the bridge FET's 132 between their conducting and non-conducting states by in response to timing signals generated by the PSC microprocessor 102. Accordingly, current flows through only one bridge circuit 145 at any given time. This reduces the total circuit current. In the preferred embodiment, the PSC microprocessor 102 monitors the voltage across a sensing resistor 146, which is connected between the power supply $V_{CC}$ and the bridge FET's 132. The current through the sensing resistor 146 is a function of the individual bridge currents and provides an indication of open or shorted bridge resistors. If the resulting voltage appearing across the sensing resistor 146 is outside of an acceptable voltage window, the PSC microprocessor 102 determines that the particular bridge circuit has an open or shorted arm and switches the corresponding bridge FET to its non-conducting state to prevent malfunctioning of the entire circuit 100 or portions thereof. The PSC microprocessor 126 also generates an appropriate error signal.

A main power FET 128 is connected across the sensing resistor 146. The main power FET 128 has a gate terminal which is connected to the strobe port of the PSC microprocessor 102. The PSC microprocessor 102 switches the main power FET 128 between its conducting and non-conducting states to control the use of the sensing resistor 146 and to supply power to the bridge circuits 145. When the main power FET 128 is non-conducting, the bridge current flows though the sensing resistor 146 and the PSC microprocessor 102 senses the voltage thereacross. The main power FET 128 is then switched to its conducting state to apply the full voltage across the associated bridge circuit 145 for the pressure sensing. Thus, the condition of each bridge circuit 145 is checked with the sensing resistor 146 before a pressure reading is taken.

The voltage from a first side of each bridge circuit 145 is supplied to the first analog output multiplexer 112 while the voltage from a second side of each bridge circuit 145 is supplied to a second analog output multiplexer 116. The resulting multiplexed analog output signals from the output multiplexers 112 and 116 are applied to the input terminals of a conventional instrumentation amplifier circuit 114. The amplifier circuit 114 includes first and second operational amplifiers 156 and 157 which have a high input impedance to assure that the bridge circuits 145 are not loaded down by the rest of the signal conditioning circuit. The outputs of the operational amplifiers 156 and 157 are electrically connected to the input terminals of a differential amplifier 158. The differential amplifier 158 generates a voltage which functions as an output analog pressure signal. The pressure signal is fed directly to a first input pin on the PSC microprocessor 102.

The differential amplifier output signal is also fed through a high resolution operational amplifier 118 to a second input pin on the PSC microprocessor 102. The PSC microprocessor 102 is usually responsive to the signal supplied from the high resolution operational amplifier 118. However, if the PSC microprocessor 102 determines that the high resolution operational amplifier 118 is saturated, the PSC microprocessor 102 uses the direct output from the differential amplifier 114. Accordingly, the high resolution operational amplifier 118 increases the resolution of the signal conditioning circuit by amplifying small magnitude pressure signals while the differential amplifier 114 provides amplification for large magnitude pressure signals. As described above, in the preferred embodiment, the gain of the high resolution operational amplifier 118 is four; however, other values for the gain also can be used. The PSC microprocessor 102 internally multiplies the direct output from the differential amplifier 114 by the same gain as used by the high resolution operational amplifier 118 so that both output signals are scaled the same. Thus, the output signal resolution is greater than that of the analog to digital converter of the microprocessor. However, the multiplied signal from the differential amplifier 114 has less resolution than the output signal from the high resolution amplifier 118.

The PSC microprocessor 102 converts the multiplexed pressure readings into a ten bit word and generates a serial data stream which is supplied to the main EHB microprocessor (not shown) over the serial data link 104. While the invention is being described as utilizing ten bit words, it will be appreciated that the invention also can be practiced using words having more or less bits. The data link 104 is bi-directional with clock, sync and data signals coupling the signal conditioning circuit 100 to the main EHB microprocessor.

As described above, the signal conditioning circuit 100 also includes a pair of temperature sensors 120 which monitor the temperature of the pressure transducer block and generate temperature signals. As also described above, in the preferred embodiment, the PSC microprocessor 102 receives the temperature signals and sends them to the EHB microprocessor. The EHB microprocessor can compensate the pressure signals for potential transducer temperature errors, which reduces the cost of the PSC. Alternately, the pressure signals can be temperature compensated within the PSC microprocessor 102. When the signal conditioning circuit 100 is assembled, the pressure sensing elements and the circuit 100 are temperature and pressure calibrated by subjecting the sensing elements 106 and the circuit to a range of expected temperatures and/or pressures. The resulting calibration data is stored in the ROM of the PSC microprocessor 102 for use by either the EHB microprocessor or the PSC microprocessor 102 for temperature compensation. This results in better accuracy since each PSC 51 is able to communicate its temperature and pressure characteristics to the EHB ECU, unlike traditional discrete sensors.

Alternately, the temperature can be determined from changes in total bridge resistance in lieu of utilizing dedicated temperature sensors. Accordingly, the temperature sensors can be eliminated from the PSC circuit 100 to further reduce costs. If this alternate approach is used, the pressure sensing elements and the circuit 100 are calibrated at the same time during manufacture of the PSC 51. The calibration data is stored in the PSC microprocessor ROM.

The PSC microprocessor 102 also is operative, to apply a test voltage through the output mutliplexers 112 and 116 to the amplifiers 158 and 160 to determine the offset and gain thereof. In the preferred embodiment, the tests include grounding the amplifier input to measure the amplifier offset and applying predetermined calibration voltages to the amplifier input to measure the amplifier gain. The predetermined calibration voltages are generated by the voltage divider 142 and other resistors. The calibration voltages are selected to be less than the saturation voltage of the high resolution amplifier 118 to assure that the full range of the amplifier 118 is calibrated. In the preferred embodiment, the amplifier offset and gain are stored in the ROM of the PSC microprocessor 102 when the signal conditioning circuit 100 is assembled and transmitted to the EHB microprocessor to further compensate the pressure signals. Alternately, offset and gain compensation can be provided directly by the PSC microprocessor 102. Those test voltages can also be used to confirm that the multiplexers and the rest of the signal conditioning path are operating properly.

The present invention also contemplates adjusting the amplifier gain and/or offset with a digital compensation scheme to compensate for variations in sense element offset, span and/or linearity characteristics at one or more temperatures. While the following describes adjusting gain, offset and linearity, it will be appreciated that the invention also can be practiced to adjust only one or two of these parameters. These compensation schemes use digitally adjustable elements through, for example, serial, parallel or incremental interfaces to change the gain and/or offset, and thereby the linearity, of the signal conditioning path. Such elements can include digital potentiometers, DAC's, switched capacitors and the such.

Figure 6:
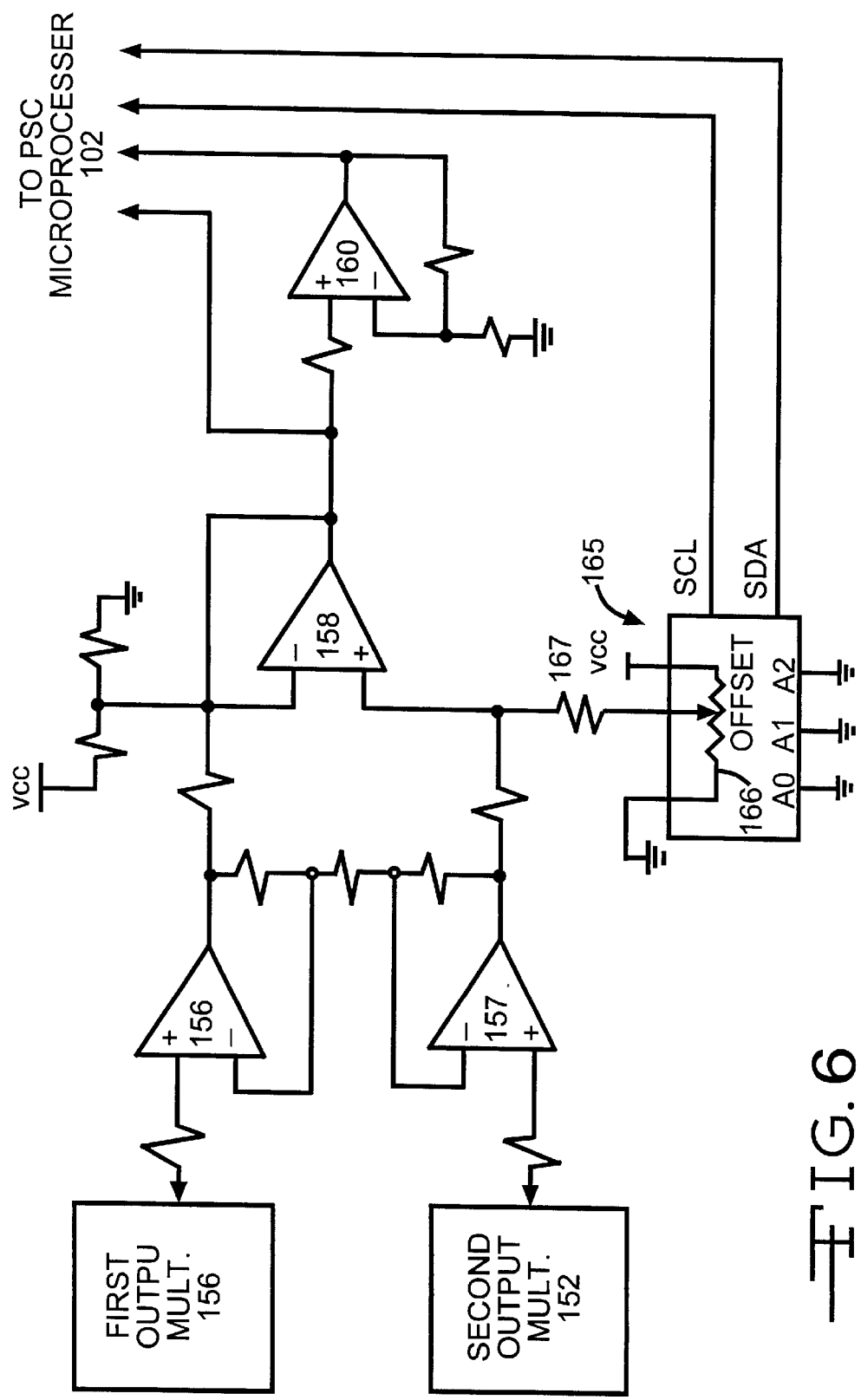
FIG. 6 is a schematic circuit diagram for a compensation circuit in accordance with the invention which can be added to the signal conditioning circuit shown in FIG. 5.

In the preferred embodiment, the amplifier offset and gain are adjusted with a digital potentiometer. The use of a digital potentiometer 165 in the signal conditioning circuit 100 to compensate an offset voltage is illustrated in FIG. 6 where only a portion of the signal conditioning circuit 100 shown in FIG. 5 is included. The offset voltage being compensated can be generated by sense element 145 being read and/or the differential amplifier 158. While an analog wiper 166 is shown schematically in FIG. 6, the digital potentiometer 165 actually includes a fixed resistor having a plurality of tap points. In the preferred embodiment, the digital potentiometer 165 has 32 tap points; however, it will be appreciated that the invention also may be practiced with a digital potentiometer having more or less tap points. The digital potentiometer 165 is connected between a regulated power supply $V_{CC}$ and ground. The tap points are selectively connected through an input resistor 167 to the positive input terminal of the differential amplifier 158 by the PSC microprocessor 102 closing electronic switches (not shown) within the digital potentiometer 165 to provide an offset correction. Thus, the digital potentiometer 165 functions as an adjustable offset input resistor. The PSC microprocessor selects a setting for the digital potentiometer 165 that corresponds to the particular sense element being read.

In the preferred embodiment, the digital potentiometer is selected to have a resistance value that is much less than the value of the input resistor 167. This assures that as the digital potentiometer value is changed, the gain of the differential amplifier 158 is not changed by much. Thus, a careful selection of the resistance values for the digital potentiometer 165 and the input resistor desensitize the circuit. However, it will be appreciated that the invention also can be practiced without such a desensitization measure.

Figure 7:
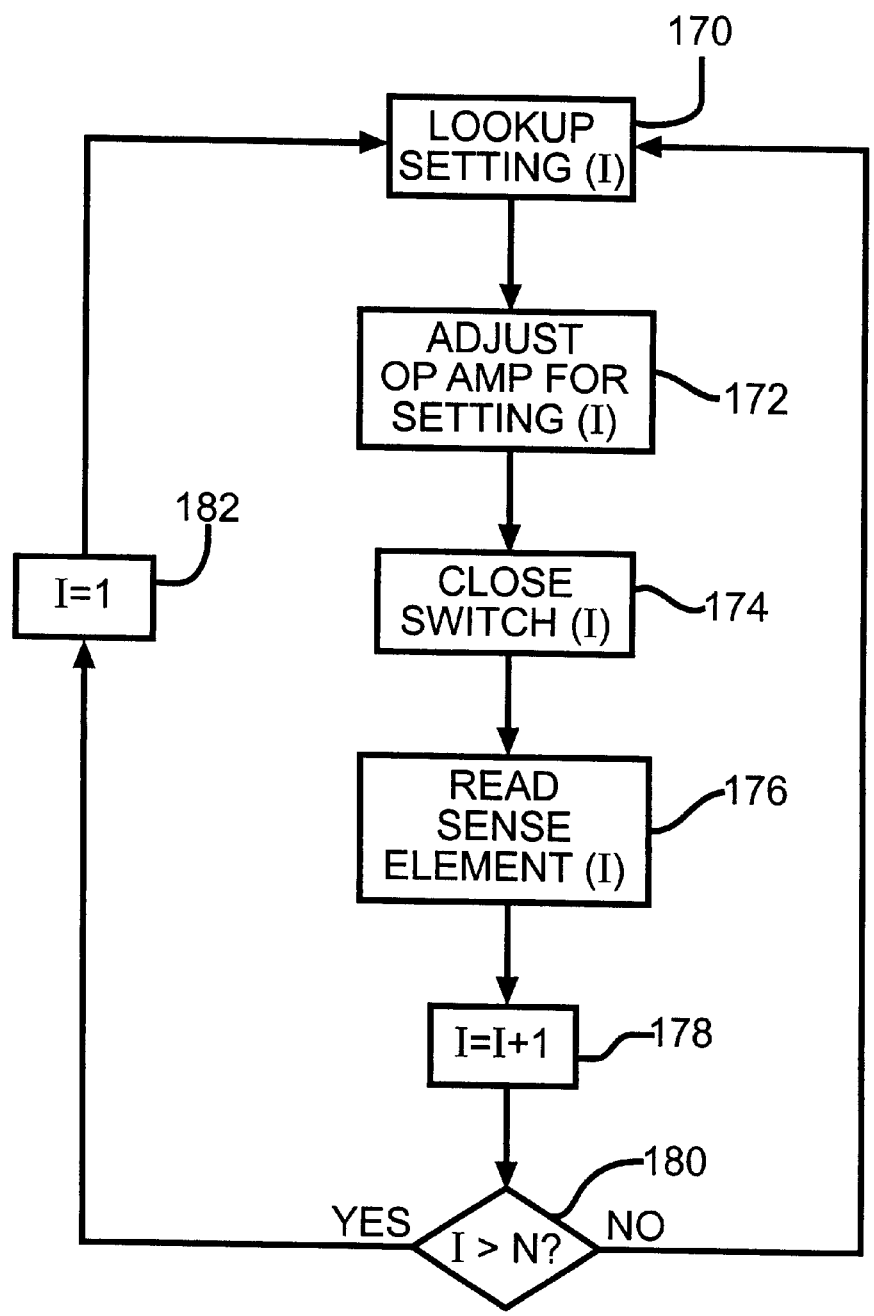
FIG. 7 is a flow chart illustrating operation of the circuit shown in FIG. 6.

The operation of the compensation scheme is illustrated by the flow chart for a subroutine shown in FIG. 7. Initially an index I that corresponds to specific sense elements 145 is set equal to one. In functional block 170, the PSC microprocessor 102 looks up a compensation setting in a Read Only Memory (ROM) (not shown) that corresponds to the current value of the index I. It is contemplated that the values in the ROM are determined during calibration testing of the PSC 51 at the manufacturing facility. In functional block 172, the PSC microprocessor adjusts the setting for the compensating circuit as per the stored ROM value. For the digital potentiometer, the appropriate tap is selected and connected to the positive input terminal of the differential amplifier 158 by closing an electronic switch (not shown). The electronic switch 132 in the signal conditioning circuit 100 is then closed to energize the corresponding bridge circuit 145 in functional block 174. The output signal generated by the energized sense element 145 is read in functional block 176. The index I is increased by one in functional 178 and compared to the total number of sense elements N in decision block 180. If the index is greater than N, all of the sense elements 145 have been read and it is necessary to reset the index to begin another set of sense element readings. Accordingly, the subroutine transfers to functional block 182 where the index I is reset to one and then returns to functional block 170. If the index is not greater that N in decision block 180, the subroutine transfers directly to functional block 170.

Figure 8:
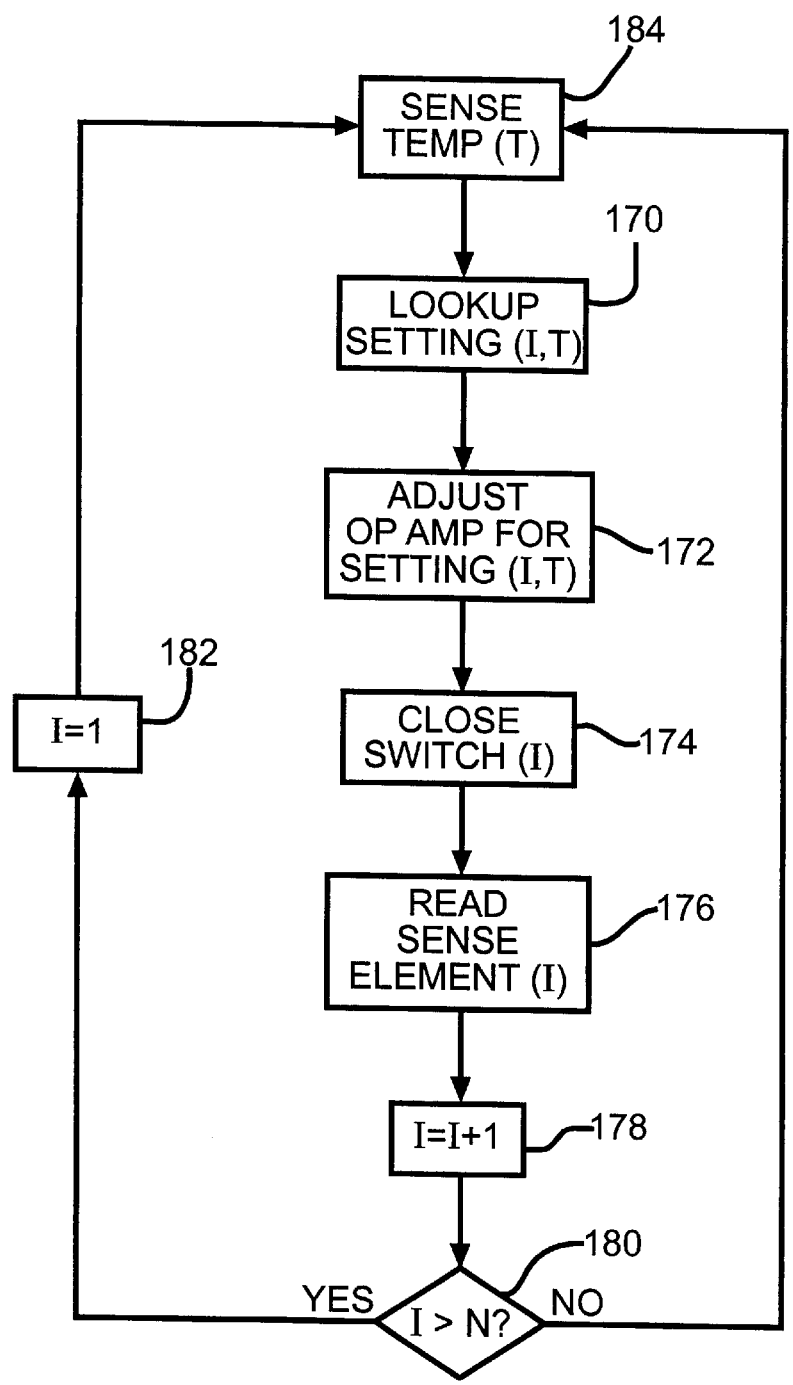
FIG. 8 is a flow chart illustrating an alternate embodiment of the operation of the circuit shown in FIG. 6.

An alternate subroutine is illustrated in FIG. 8. Blocks in FIG. 8 that are the same as shown in FIG. 7 have the same numerical identifiers. The alternate subroutine compensates for both the particular sense element I and the temperature T. Accordingly, the alternate subroutine includes a functional block 184 within which the PSC microprocessor 102 reads the current outputs from the temperature sensors 120. Then in functional block 170 a compensation setting that is a function of both the current index and the current temperature is looked up in the ROM. Accordingly, the invention contemplates a matrix of compensation settings. The remaining steps in the subroutine then continue as described above. It will be appreciated, that while the subroutine was described for selecting a digital potentiometer setting to compensate the signal conditioning circuit 100, the subroutine also can be used with other compensation schemes, including the schemes described below.

It will be appreciated that the flow charts shown in FIGS. 7 and 8 are intended to be exemplary and that details may vary. For example, it possible that the sequence of sampling the sensors may be determined by the ECU microprocessor and may not proceed in the numerical sequence illustrated. Thus, the flowcharts would include an additional functional block (not shown) in which a particular sensor would be selected as a function of the current index value.

Figure 9:
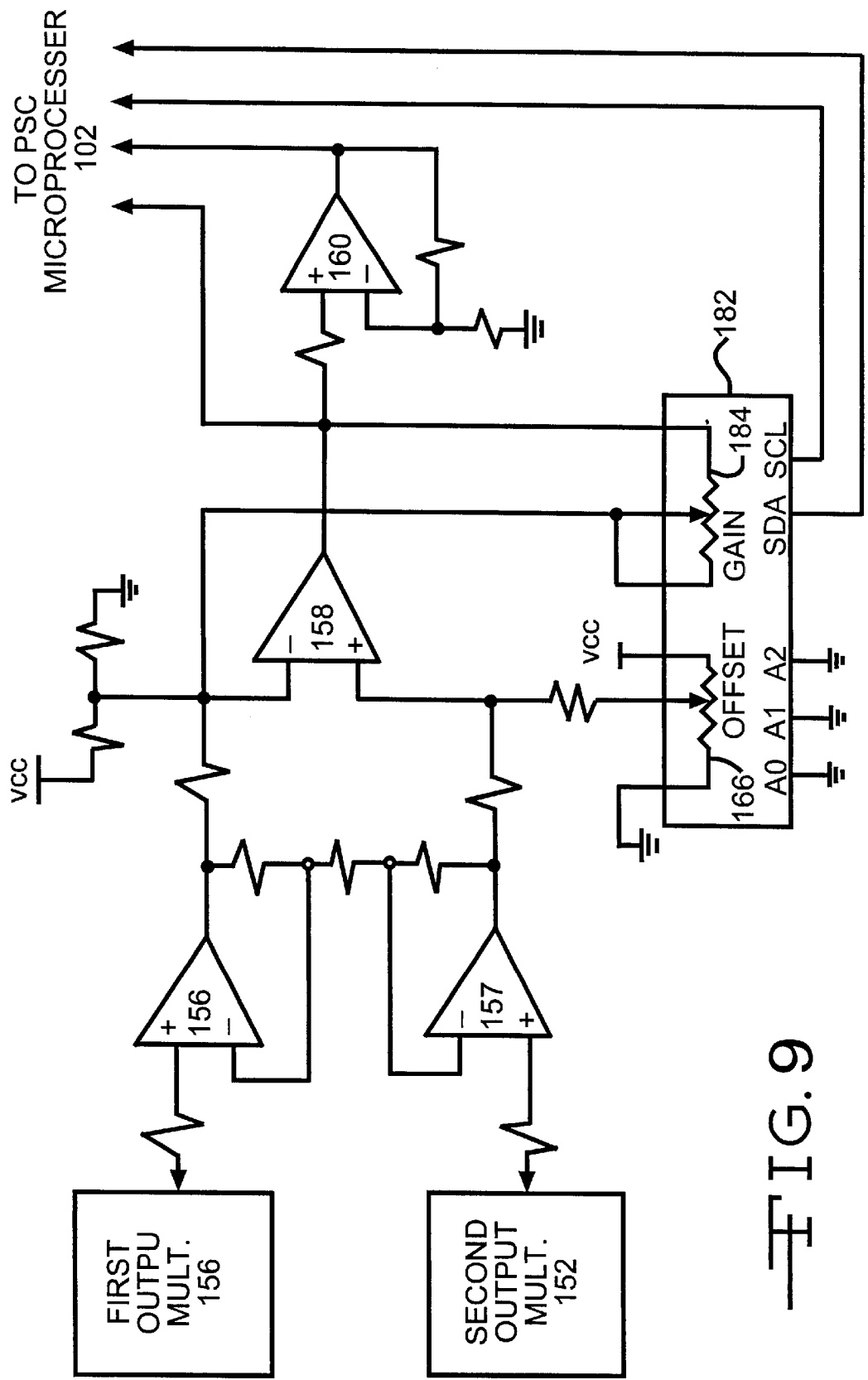
FIG. 9 is an alternate embodiment of the compensation circuit shown in FIG. 6.

An alternate embodiment of the digital potentiometer compensation circuit is shown in FIG. 9. In FIG. 9, a digital potentiometer 182 includes a pair of fixed resistors 166 and 184. Each of the resistors 166 and 184 has a plurality of tap points that are digitally controlled by the PSC microprocessor 102. Again, in the preferred embodiment, there are 32 tap points for each of the resistors; however, more or less tap points may be utilized. The taps points of first resistor 166 are connected to the positive input terminal of the differential amplifier 158 as described above. Thus, the first resistor functions as an adjustable offset resistor. The second potentiometer resistor 184 is connected between the output and negative input terminals of the differential amplifier 158. The tap terminal of the second potentiometer resistor 184 is connected to the negative input terminal of the differential amplifier 158. Alternately, the second potentiometer resistor 184 can be connected between the output of the first operational amplifier 156 and the output terminal of the differential amplifier 158 with the tap terminal connected to the negative input terminal of the differential amplifier 158 (not shown). The value of the second resistor 184 can be reduced by selection of taps to bypass a portion of the resistor 184. Accordingly, the second resistor 184 functions as a feedback resistor and controls the gain of the differential amplifier 158.

In the preferred embodiment, the sensitivity of the gain to changes in the value of the resistance of the second digital potentiometer resistor 184 can be accomplished by connecting the second digital potentiometer resistor 184 between two larger fixed resistors (not shown). The fixed resistors are selected to provide a gain that is close to the desired value. Thus, the digital potentiometer resistor 184 functions to trim the fixed resistors for a final gain. Alternately, the identification of the output tap selected for the second digital potentiometer resistor 184 can be supplied to the ECU microprocessor. The ECU microprocessor would then compensate for the changes in gain due to changes in the tap settings. However, it will be appreciated that the invention also can be practiced without such desensitization measures.

It is contemplated that the PSC microprocessor 126 reads data from a lookup table stored in its ROM to select the values of the potentiometer resistors 166 and 184. As described above, the lookup table values are selected for each of the bridge circuits 145 and stored during calibration of the signal conditioning circuit 100. The compensation values are then changed by the PSC microprocessor 102 to match the individual sensor bridge circuits 145. As described above, when a particular sensor 59 is selected for sampling, the needed compensation for the associated bridge circuit 145 is obtained from the lookup table in the ROM and signals are sent to the digital potentiometer 182 to adjust the offset and gain potentiometers 166 and 184 accordingly. Thus, each of the pressure sensor bridge circuits 145 can be compensated by one circuit instead of providing passive compensation circuits for each sensor bridge circuit 145, as was done in the past.

Figure 10:
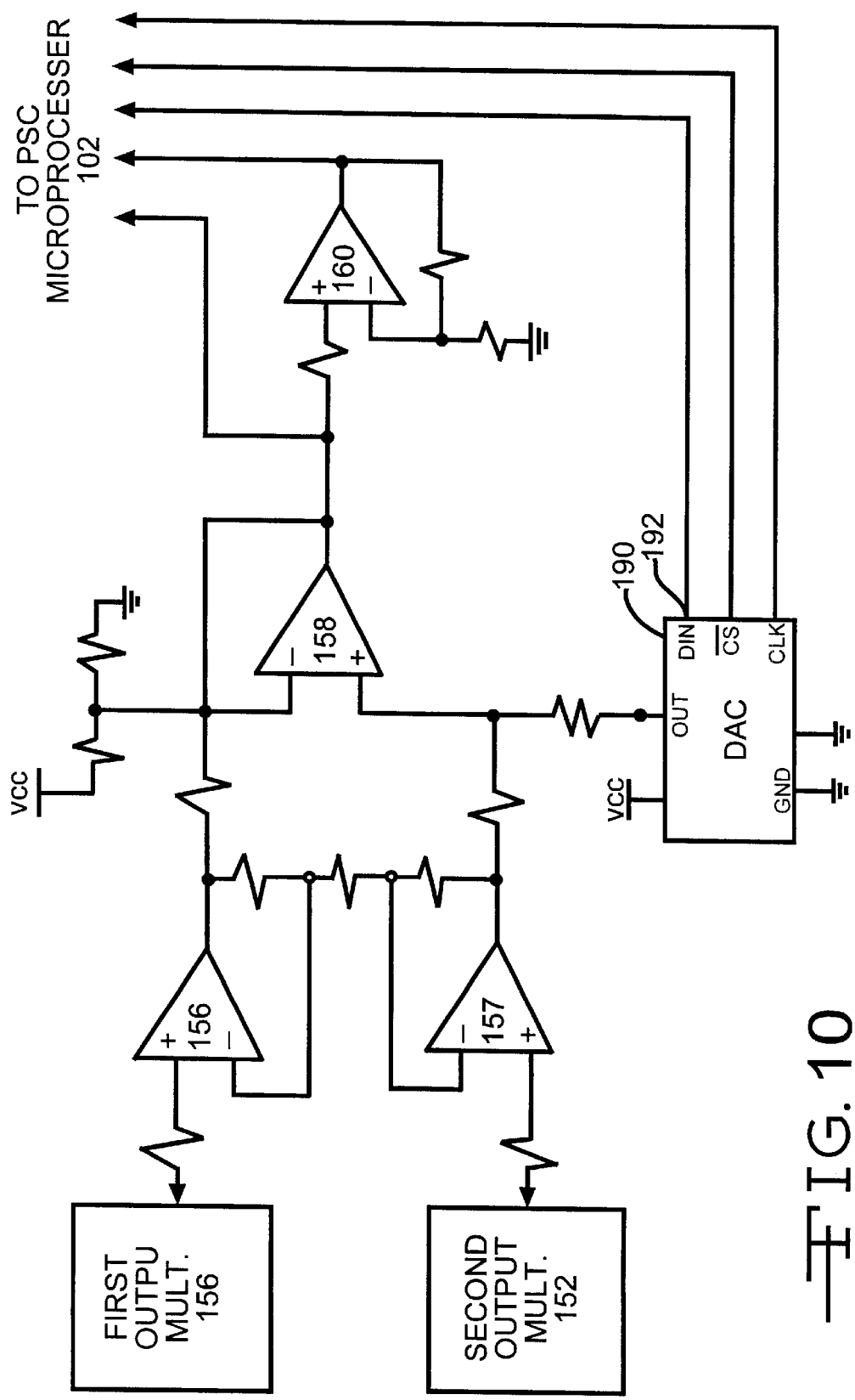
FIG. 10 is another alternate embodiment of the compensation circuit shown in FIG. 6.

Another compensation scheme is illustrated in FIG. 10 where a Digital to Analog Converter (DAC) 190 has an output terminal connected to the positive input terminal of the differential amplifier 158. The output of the DAC 190 is an analog voltage that is a function of the digital signal applied to a data in port 192. The data in port 192 is connected to the PSC microprocessor 102. The PSC microprocessor selects an appropriate digital code from a lookup table in the ROM and transmits the code to the DAC 190 which converts the code to a corresponding voltage. Thus the DAC 190 operates to adjust the offset of the differential amplifier 158 as described above for the one resistor digital potentiometer 165 shown in FIG. 6.

Figure 11:
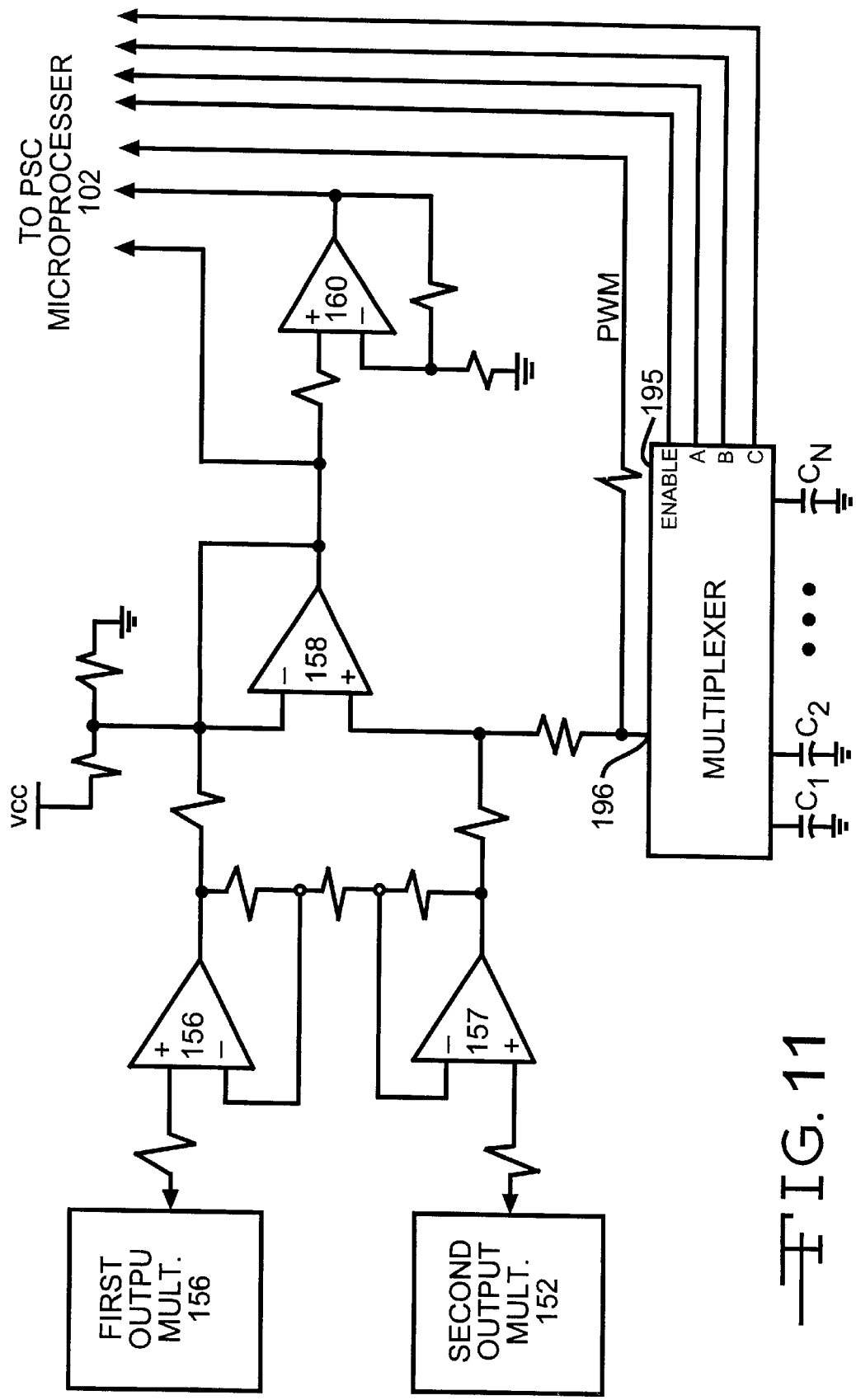
FIG. 11 is another alternate embodiment of the compensation circuit shown in FIG. 6.

A third compensation scheme utilizes multiplexed capacitors as illustrated in FIG. 11. A plurality of capacitors labeled $C_1$ through $C_N$ are connected between switching terminals of a multiplexer 195 and ground. In the preferred embodiment, the capacitors $C_1$ through $C_N$ all have the same value of capacitance. A multiplexer output terminal 196 is connected through a resistor to the positive input terminal of the differential amplifier 158. The multiplexer 195 also includes three input terminals labeled A, B and C that are connected to the PSC microprocessor 102. A fourth input terminal labeled enable receives a Pulse Width Modulated (PWM) signal. In the preferred embodiment, the duty cycle of the PWM signal is variable.

The operation of the multiplexer 195 will now be explained. During operation of the signal conditioning circuit 100, the PSC microprocessor determines a digital compensating code corresponding to values in the lookup table store in the ROM for the particular sense element 145. The code is transmitted to the multiplexer input terminals A, B and C. The multiplexer 195 is responsive to the digital compensating code to intermittently connect a corresponding capacitor to the multiplexer output terminal 196. When the selected capacitor is not connected to the input terminal of the differential amplifier 158, it is connected by the multiplexer 195 to the PWM signal available over at the enable terminal for charging. Thus, the capacitor is charged by the PWM signal to a voltage determined by the duty cycle of the PWM signal. The value of the capacitors is selected to be large enough that that the capacitor does not significantly discharge while connected to the input terminal of the differential amplifier 158 and small enough for the capacitor to recharge when connected to the PWM signal.

The invention further contemplates that, upon initial vehicle start up, the PSC microprocessor 102 switches the multiplexer 195 to fully charge all the capacitors. The duty cycle of the PWM signal is selected for each of the capacitors, $C_1$ through $C_N$, to charge the capacitor to the desired voltage level, which is the average value of the PWM signal. Similarly, during operation of the circuit, the duty cycle of the PWM signal is varied to correspond to the particular capacitor selected for charging. Accordingly, each capacitor charges to a different voltage and provides a different voltage value for application to the positive input terminal of the differential amplifier 195. Thus the multiplexer 195 and capacitors function in similar manner to adjust the offset of the differential amplifier 158 as described above for the one resistor digital potentiometer 165 shown in FIG. 6.

The signal conditioning circuit 100 provides a number of advantages over the prior art. The circuit 100 replaces six discrete ASIC's, which would be used in prior art, with shared electronic components which multiplex, amplify and convert the individual pressure signals. Accordingly, the shared electronic components can be integrated into a single ASIC to reduce part count and costs. The PSC or EHB microprocessor can linearize and compensate data in the digital domain to improve accuracy. Furthermore, the PSC or EHB microprocessor can provide additional advanced diagnostics. The overall reliability of the data gathering circuitry and data integrity is improved while serial communication is provided between the pressure sensors and the EHB microprocessor.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. Thus, while the preferred embodiment has been illustrated and described with an EHB, it will be appreciated that the invention also can be practiced with other systems.

What is claimed is:

1. A hydraulic control valve comprising:
    a control valve body having a plurality of passageways formed therein, said passageways adapted to be connected to a hydraulic control system;
    a plurality of pressure sensors carried by said control valve body, each of said pressure sensors communicating with a selected one of said passageways, each of said sensors operative to generate a pressure signal voltage that is a function of a fluid pressure in said selected passageway; and
    a single signal conditioning circuit also carried by said control valve body, said signal conditioning circuit electrically connected to each of said pressure sensors, said signal conditioning circuit including an adjustable circuit that provides selective compensation for each of the pressure sensors, said signal conditioning circuit operative to sequentially sample each of said pressure signal voltages and to generate an analog multiplexed signal that includes said pressure signal voltage samples.

2. A hydraulic control valve comprising:
    a control valve body having a plurality of passageways formed therein, said passageways adapted to be connected to a hydraulic control system;

a plurality of pressure sensors carried by said control valve body, each of said pressure sensors communicating with a selected one of said passageways, each of said pressure sensors including a bridge circuit, each of said bridge circuits generating a first output voltage and a second output voltage with the difference between said first and second output voltages being proportional to said fluid pressure in said passageway; and a signal conditioning circuit also carried by said control valve body, said signal conditioning circuit including a first multiplexer having a plurality of input terminals with a selected input terminal connected to said first bridge output voltage of each sensor bridge circuit and a second multiplexer having a plurality of input terminals with a selected input terminal connected to said second output voltage of each bridge circuit, said first multiplexer operative to generate a first multiplexed output voltage at a first output terminal and said second multiplexer operative to generate a second multiplexed output voltage at a second output terminal, said first multiplexer output terminal being connected to a first input terminal of a differential amplifier and said second multiplexer output terminal being connected to a second input terminal of said differential amplifier, said differential amplifier having an output terminal connected to an input port of a microprocessor, said differential amplifier being operational to generate a multiplexed pressure voltage signal that includes the difference of each of the bridge first and second voltage signals and to apply said multiplexed pressure voltage signal to said microprocessor input port.

3. The hydraulic control valve according to claim 2 wherein said signal conditioning circuit includes an offset compensation circuit for said differential amplifier.

4. The hydraulic control valve according to claim 3 wherein said offset compensation circuit includes a first digital resistor connected across a voltage supply, said first digital resistor having an output tap terminal connected to an input terminal of said differential amplifier and a control terminal connected to said microprocessor, said microprocessor operative to select a value for said first digital resistor that corresponds to a particular sensor bridge circuit whereby said first digital resistor will cause a voltage to be applied to said differential amplifier input port to compensate for an offset voltage.

5. The hydraulic control valve according to claim 4 wherein said offset voltage is generated by said sensor bridge circuit.

6. The hydraulic control valve according to claim 4 wherein said offset voltage is generated by said differential amplifier.

7. The hydraulic control valve according to claim 4 wherein said offset voltage is generated by both said sensor bridge circuit and said differential amplifier.

8. The hydraulic control valve according to claim 4 wherein said compensating digital resistor values are stored in a memory portion of said microprocessor.

9. The hydraulic control valve according to claim 4 wherein said signal conditioning circuit further includes a fixed resistor connected between said output tap terminal of said first digital resistor and said differential amplifier input terminal.

10. The hydraulic control valve according to claim 4 further including a temperature sensor mounted upon said valve body and connected to said microprocessor, said temperature sensor operative to generate a temperature signal that is proportional to the temperature of the hydraulic fluid and said microprocessor being operative to select a compensating digital resistor value that is a function of both said bridge circuit being sensed and said hydraulic fluid temperature.

11. The hydraulic control valve according to claim 4 further including a second digital resistor connected between said output terminal of said differential amplifier and an input terminal thereof, said second digital resistor having an output tap terminal also connected to said same differential amplifier output terminal and a control terminal connected to said microprocessor, said microprocessor operative to select a value for said second digital resistor that corresponds to a particular sensor bridge circuit whereby said second digital resistor provides gain compensation for said differential amplifier.

12. The hydraulic control valve according to claim 11 further including a temperature sensor mounted upon said valve body and connected to said microprocessor, said temperature sensor operative to generate a temperature signal that is proportional to the temperature of the hydraulic fluid and said microprocessor being operative to select a compensating first and second digital resistor values that are functions of both said bridge circuit being sensed and said hydraulic fluid temperature.

13. The hydraulic control valve according to claim 3 wherein said signal conditioning circuit includes a digital to analog converter having an output terminal connected to an input terminal of said differential amplifier and an input terminal connected to said microprocessor, said microprocessor operative to select an input value for said digital to analog converter that corresponds to a particular sensor bridge circuit whereby said digital to analog converter will cause a voltage to be applied to said differential amplifier input port to compensate for an offset voltage.

14. The hydraulic control valve according to claim 3 wherein said signal conditioning circuit includes a third multiplexer having a plurality of input terminals, each of said input terminals connected to a charged capacitor, said third multiplexer also having an output terminal connected to an input terminal of said differential amplifier and a control terminal connected to said microprocessor, said microprocessor operative to cause said third microprocessor to selectively connect one of said capacitors that corresponds to a particular sensor bridge circuit to said differential amplifier input terminal, whereby said charged capacitor will apply a voltage to said differential amplifier input port to compensate for an offset voltage.

15. The hydraulic control valve according to claim 14 wherein said microprocessor sequentially connects said capacitors to said differential amplifier input terminal to provide said compensation.

16. The hydraulic control valve according to claim 15 wherein each of said capacitors is recharged while the other of said capacitors are connected to said differential amplifier input terminal.

17. The hydraulic control valve according to claim 16 where said capacitors are recharged with a pulse width modulated signal.

18. The hydraulic control valve according to claim 17 wherein all of said capacitors have the same value and said pulse width modulated signal has a variable duty cycle, said microprocessor being operable to select a duty cycle to charge a corresponding capacitor to a desired voltage level to provide said compensation.

19. The hydraulic control valve according to claim 11 wherein the hydraulic control valve is included in a electro-hydraulic brake system.

20. A method for compensating a signal conditioning circuit comprising the steps of:

(a) providing a signal conditioning circuit connected to a plurality of bridge circuits, the signal conditioning circuit including a differential amplifier having a compensating component connected to an input terminal thereof, the signal conditioning circuit being operative to sequentially sample the output voltages of the individual bridge circuits and to sequentially apply the sampled output voltages of the bridge circuits to the input of the differential amplifier;

(b) selecting a predetermined value for the compensating component that corresponds to the particular individual bridge circuit being sampled; and (c) using the selected predetermined value to cause the compensating component to apply a fixed compensating voltage that is related to the particular bridge circuit that is being sampled to the differential amplifier input terminal whereby the differential amplifier is compensated for an offset voltage.

21. A method according to claim 20 wherein the signal conditioning circuit also includes a temperature sensor and further wherein step (a) includes sensing the temperature and step (b) includes selecting a value for the compensating component that corresponds to the individual bridge circuit being sampled and also is a function of the sampled temperature.

22. A method according to claim 20 wherein the compensating component includes a first digital resistor.

23. A method according to claim 22 wherein the differential amplifier input terminal in step (a) is a first input terminal and further wherein the signal conditioning circuit also includes a second digital resistor connected between an output terminal of the differential amplifier and a second input terminal of the differential amplifier and step (b) also includes selecting a value for the second digital resistor that corresponds to the individual bridge circuit being sampled whereby the second digital resistor provides gain compensation for the differential amplifier.

24. A method according to claim 20 wherein the compensating component includes a digital to analog converter.

25. A method for compensating a signal conditioning circuit comprising the steps of:

(a) providing a signal conditioning circuit connected to a plurality of bridge circuits, the signal conditioning circuit including a differential amplifier having a compensating component connected to an input terminal thereof, the compensating component including a multiplexer having a plurality of input terminals, each of the input terminals connected to a charged capacitor, the multiplexer also having an output terminal connected to an input terminal of the differential amplifier and a control terminal connected to a microprocessor, the signal conditioning circuit being operative to sequentially sample the output voltages of the individual bridge circuits; and (b) causing the multiplexer to selectively connect one of the capacitors, the capacitor corresponding to a particular sensor bridge circuit, to the differential amplifier input terminal, whereby the charged capacitor will apply a voltage to the differential amplifier input port to compensate for an offset voltage.

* * * * *